United States Patent
Tormasov et al.

(10) Patent No.: US 7,552,310 B1
(45) Date of Patent: *Jun. 23, 2009

(54) VIRTUALIZATION AND HOSTING SERVICE PLATFORM SYSTEM AND METHOD

(75) Inventors: Alexander Tormasov, Moscow (RU); Dennis Lunev, Moscow (RU); Serguei Beloussov, Singapore (SG); Stanislav Protassov, Moscow (RU); Yury Pudgorodsky, Moscow (RU)

(73) Assignee: SWsoft Holdings, Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/196,872

(22) Filed: Aug. 22, 2008

Related U.S. Application Data

(63) Continuation of application No. 11/382,047, filed on May 7, 2006, now Pat. No. 7,469,323, which is a continuation of application No. 10/005,590, filed on Oct. 26, 2001, now Pat. No. 7,076,633.

(60) Provisional application No. 60/279,335, filed on Mar. 28, 2001.

(51) Int. Cl.
*G06F 12/06* (2006.01)

(52) U.S. Cl. ........................ 711/203; 711/148; 709/226; 709/203

(58) Field of Classification Search .............. 711/203, 711/154, 148; 709/203, 223, 202, 201, 205, 709/209, 208, 226, 213; 712/10, 12, 7; 718/100, 718/104, 107, 105
See application file for complete search history.

(56) References Cited

U.S. PATENT DOCUMENTS

| | | | |
|---|---|---|---|
| 5,113,523 A * | 5/1992 | Colley et al. ................... 712/12 |
| 5,511,217 A | 4/1996 | Nakajima et al. |
| 5,961,582 A | 10/1999 | Gaines |
| 6,026,474 A | 2/2000 | Carter et al. |
| 6,173,374 B1 | 1/2001 | Heil et al. |
| 6,434,594 B1 * | 8/2002 | Wesemann ................... 709/201 |
| 6,438,705 B1 | 8/2002 | Chao et al. |
| 6,701,437 B1 | 3/2004 | Hoke et al. |
| 6,757,778 B1 | 6/2004 | van Rieschote |
| 6,779,016 B1 | 8/2004 | Aziz et al. |
| 6,823,462 B1 | 11/2004 | Cheng et al. |
| 7,146,640 B2 | 12/2006 | Goodman et al. |
| 2002/0049803 A1 | 4/2002 | Bandhole et al. |
| 2002/0055989 A1 | 5/2002 | Stringer-Calvert et al. |
| 2002/0091697 A1 | 7/2002 | Huang et al. |
| 2002/0095496 A1 | 7/2002 | Antes et al. |
| 2002/0143960 A1 | 10/2002 | Goren et al. |
| 2002/0147815 A1 | 10/2002 | Tormasov et al. |

(Continued)

OTHER PUBLICATIONS

Mullender et al., Amoeba A Distributed Operating System for the 1990s, Computer, IEEE, pp. 44-51, Jan. 1990.*

(Continued)

*Primary Examiner*—Pierre-Michel Bataille
(74) *Attorney, Agent, or Firm*—Bardmesser Law Group

(57) ABSTRACT

A computer cluster for providing hosting services includes a plurality of nodes, and a control center coordinating activity of the nodes. Each node includes a plurality of virtual environments such that each virtual environment responds to user requests and appears to the user as having its own operating system. Multiple virtual environments running on the same node share the same host operating system of the node.

20 Claims, 5 Drawing Sheets

U.S. PATENT DOCUMENTS

| | | | |
|---|---|---|---|
| 2002/0188657 A1 | 12/2002 | Traversat et al. | |
| 2003/0037134 A1 | 2/2003 | Hickman | |
| 2006/0053215 A1* | 3/2006 | Sharma | 709/223 |

OTHER PUBLICATIONS

Mullender et al., A Distributed File Service Based on Optimistic Concurrency Control, Proceedings of the 10.sup.th ACM SIGOPS Conference, pp. 51-62, Association for Computing Machinery, Inc., 1985.*

Deborah Hix , J. Edward Swan, II , Joseph L. Gabbard , Mike McGee , Jim Durbin , Tony King, "User-Centered Design and Evaluation of a Real-Time Battlefield Visualization Virtual Environment", Proceedings of the IEEE Virtual Reality, p. 96, Mar. 13-17, 1999.*

"Virtual PC for Windows," Connectix, Version 5.0, 2002, 2 pages.

Dave Gardner, et al., "Wine Faq,", David Gardner 1995-1998, printed from www.winehq.org, 13 pages.

"What is Virtual Environment(VE)?," SWsoft, http://www.sw-soft/en/products/virtuozzo/we/, Copyrgt. 1994-2002 SWsoft, printed from web on Dec. 13, 2002, 2 pages.

"The Technology of Virtual PC," A Conneectix White Paper, Connectix Corp., 2000, 12 pages.

Connectix Ships Virtual PC With Windows 2000, http://www.macobserver.com/news/00/march/000327/vpcw2k.shtml, Mar. 27, 2000.

Virtual PC 4 Special Report, http://www.macwindows.com/VPC4.html, Jul. 2005.

Special Report: Interview with Connectix CEO Roy McDonald, http://www.macwindows.com/MW99conn.html, Jan. 7, 1999.

Speech Transcript—Rick Rashid, PC Futures '98, http://www.microsoft.com/presspass/exec/rick/6-11pcfutures.mspx, Jun. 11, 1998.

"(W{hacek over (e)}bop dia) The #1 online encyclopedia dedicated to computer technology". http://www.pcwebopedia.com/TERM/m/mainframe.html, p. 1.

Crowley, Charles. "Operating Systems: a design-oriented approach". Irwin, 1997, pp. 753, 757.

Tanenbaum, Andrew S. "Distributed Operating Systems". Prentice Hall, 1994, pp. 246-249.

Network Working Group. "Request for Comments: 1945 Hypertext Transfer Protocol—HTTP/1.0". http://www.faqs.org/rfcs/rfc 1945.html.

Eckel, George. "Building a UNIX Internet Server". New Riders Publishing, 1995, pp. 10-13, 46-47.

"The Common Gateway Interface". http://hoohoo.ncsa.uiuc.edu/cgi.

Carter, Todd W. Beginner's Guide to ASP: Introduction. May 9, 2000. http://www.aspstreet.com/archive/d.taf, (6 pages).

"z/VM V4 R2.0 General Information Manual". http://www.vm.ibm.com/pubs/pdf/hcsf8a41.pdf, pp. 11-12.

* cited by examiner

VIRTUALIZATION AND HOSTING SERVICE PLATFORM SYSTEM AND METHOD

This patent application is a continuation of U.S. patent application Ser. No. 11/382,047, filed on May 7, 2006, which is a continuation of U.S. patent application Ser. No. 10/005,590, filed on Oct. 26, 2001, entitled HOSTING SERVICE PROVIDING PLATFORM SYSTEM AND METHOD, which in turn claims the benefit of U.S. Provisional Patent Application Ser. No. 60/279,335 filed Mar. 28, 2001, which are all incorporated by reference herein in their entirety.

FIELD OF THE INVENTION

The present invention pertains to a computer hosting service; more particularly, the present invention describes a computer hosting service providing a platform system and method where computer clusters serving as a platform are configured automatically and have a system of virtual environments (VE) integrated with a distributed file system.

BACKGROUND

The task of providing a computer hosting service arose with the onset of linking computers together. The idea of providing a set of application services by a particular server to outside personal computer users arose with the creation of shared access centers. Generally, these shared access centers consisted of mainframe computers which allowed user access to some services, such as booking offices.

The rapid growth of the Internet and the need for remote access to servers profoundly increased the demand for a computer hosting service. The growing need for quality and efficiency of both Internet access channels and servicing computers led to the rapid growth in the creation of data centers and the services they provide.

The provision of remote computer hosting service is based on the client-server concept. The problem of shared access to files, for instance, can be efficiently solved using a client-server model. Traditionally, the problem of shared access to files was dealt with by providing a corresponding service to one of the network computers, e.g., by means of a file server. When a file server was used, software installation was required to allow the other computers to work with files located at the corresponding server. This functionality was achieved by copying the files locally or by emulating access to the network files for files located at a virtual local disk. For instance, the DOS software developed for the operating systems of IBM PC compatible computers has been organized in exactly this way. Client software, properly connected to both the network and the corresponding file server, displayed the so-called network drive. As a result, the locally launched software of a client will work with remote files in the same manner as if the remote files were placed on a local hard drive.

More sophisticated problems occur when the server and services are spaced far apart and linked together by the Internet global network, e.g., files at a server to which access is provided by special network protocols such as the http-World Wide Web service-protocol. These protocols are intentionally tailored to function in a distributed client-server network with connections which are looser than those found in a local network such as described above.

Servicing such a protocol requires WWW server installation with a stable Internet connection plus regular computer and service functioning.

Such services require substantial capital investments and are primarily available in the data centers. Only the professional computer centers can render safe and dedicated Internet access lines, surplus power supply, cooling, and fire/damage protection.

Typically, data center customers receive the following services and equipment:
  dedicated data center-owned computer with network access fully operated by the customer
  installation of the customer's computer in the data center, i.e., collocation service; and
  a data center computer partially operated by a customer for use of services provided at the discretion of the data center.

The last service mentioned above may occur if the data center has specially trained personnel and software. Usually a separate department or an independent company carries out this service while a data center simply provides all the necessary equipment. Today, such companies frequently provide the "web hosting" or, in other words, permit the providers' web servers to be filled with independent contents.

Traditionally, web-hosting companies render their own web-servers as they are, without any configuration modifications. Installation of the so-called scripts or executable CGI files, written in a Perl-type interpretive language, may present certain difficulties. The scripts should be executed at the server together with instructions received from users. Usually the scripts are used for dynamic generation of web page content. Most active servers have long been generating almost all of their pages by this "on-the-fly" technique. However, mutual utilization of these applications may cause a number of difficulties, including versions of language interpreters, web-servers and webserver configurations, incorrectly written applications, and associated server failure, plus loss of security and unauthorized access to data.

Under the prior art scheme described above, users get access to the shared server but are not able to modify the shared server configuration to their preferences and needs (See FIG. 1). Scripts that are launched in the common environment for all users and any script with the slightest problem immediately influence every participant of the scheme.

The set of required uses goes beyond web-hosting to include such widespread services as e-mail and ftp services of electronic mail and file access. Difficulties arising under their functioning are similar to those of the www service described earlier. Moreover, users often prefer access to a separate computer connected to the Internet, i.e., via telnet or secure shell connection.

In today's market, Application Service Providers (ASP) represent another class of hosting services that are in demand. Usually, Application Service Providers provide shared access to a shared application such as a database, which is installed and administered by the provider's system engineer. User access is restricted to the database alone Access to office applications, for example, is practically impossible as their installation implies that there is only one user. Security of data access is yet another problem.

Presently available services are generally limited to web/cmail/ftp servers or services which allow users to install a dedicated computer independently and then to be responsible for its administration.

Applications-emulators of an operating system may be potentially used for personal remote computers. Multiple Virtual Storage (MVS), applied in IBM systems software, appears to be one of the first such emulators, When applied, the users receive a full-sized computer with emulating hardware and the opportunity to install their own version of an operating system. Both hardware and software in this case must meet a high standard of quality and are consequently very costly. Only companies with qualified personnel and adequate start-up capital for the initial system installation choose this option.

Until recently, similar systems with the much cheaper IBM PC compatibles have not met the technical requirements. Nearly complete emulation of hardware by software and the functioning of two kernels of operating system (one on top of another on the same computer) has resulted in a small scalability with high maintenance overhead. Users working in such an environment typically become dissatisfied with the resources consumed and the emulator performance proportion. An insufficient level of hardware specialization has made these methods impractical with the IBM PC architecture for mass customer servicing.

Nevertheless, the problem of providing high quality, efficient computer hosting services persists and remains unsolved. There is a need in the art for improved unification and simplification for both users and administrators. For simplicity and to ease hardware emulation, a small set of options, available at the operating system inside the emulator, would be preferable. The installation process and system support should be simplified. Maintenance and Administration of the underlying operating system should be streamlined and require fewer resources. Such virtualized pseudo-hardware should be less diverse and require less maintenance than real data center hardware. Such a system should narrow support to highly unified configurations in order to simplify the work of system engineers and administrators and allow the development of efficient control and monitoring software for the entire complex.

Additionally, there exists a need to minimize the users' physical access to the network and computer hardware. This is another big problem for data centers. Today, client service at data centers requires that clients have extensive physical access to their own computers. Thus, data center management is forced to use high-end control and access-providing technologies that require expensive and not necessarily effective security measures against physical damage. Such measures include secured vaults, antibombing devices and protection against access to data center equipment and data center customers' computers. However, such a need for frequent hardware access is often caused by the outdated computer organization employed. User access and physical contact with hardware is inevitable when users alone can get the computer reloaded by means of special repairing disks. What is needed is a system and method which does more than simply reducing such contacts but also completely eliminates procedures of this kind and vests rights of hardware interference with the data center personnel only.

SUMMARY

This invention is directed to a system and method for utilization of computer clusters with automatic configuration and virtual environments that are integrated with a distributed file system as a platform for providing hosting services. The virtual environment of the present invention emulates no hardware and is essentially a personal protected machine with an independent operating system that functions as a separate workstation or server.

The virtual environments on the same computer are completely isolated from each other, yet are highly unified, with simple, well-formulated, and economical installation and maintenance. The system permits all private data from every virtual environment to be visible at every participating computer. Thus, all virtual environments may be restarted at any computer of the cluster. Additionally, every virtual environment may be easily moved from one computer to another.

In the present invention, a set of virtual environments is launched and several computers are combined with a distributed file system and a control center into a sharable cluster. End users are linked to their virtual environments via the Internet. Administration is carried out through the control center by means of the Internet or local network. Installation, repairs, and backup are accomplished simply and efficiently. Cluster functioning is primarily accomplished without administrator participation. Thus, the present invention promotes efficient control and monitoring of the entire system by the data center personnel and minimizes the users' physical access to the network and computer hardware. Such controlled access and protection of data integrity enhance system security and reliability.

BRIEF DESCRIPTION OF THE DRAWINGS

A better understanding of the hosting service providing platform system and method of the present invention may be had by reference to the drawing figures, wherein.

DETAILED DESCRIPTION OF THE EMBODIMENTS

Figure 1:
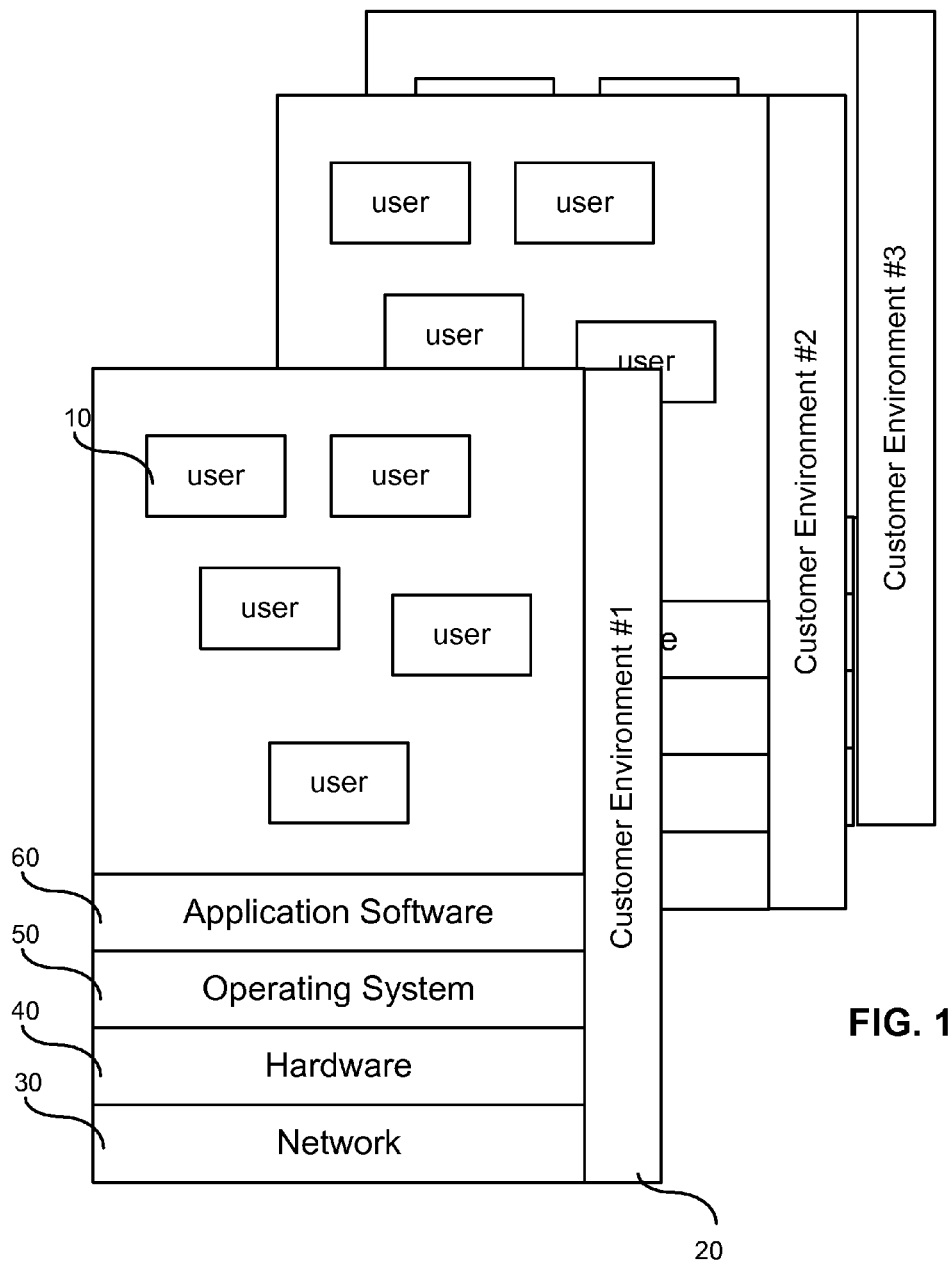
FIG. 1 is schematic of the traditional architecture used for work organization of computers and users.

As shown in FIG. 1, the traditional architecture 100 used for work organization of computers and users included a customer environment 20 consisting of network access 30, hardware 40, operating system 50, and application software 60. The environment 20 was accessed by multiple users 10 and the architecture was duplicated for every customer environment.

In lieu of this configuration, the present invention suggests the utilization of a virtual environment for providing hosting services.

Figure 2:
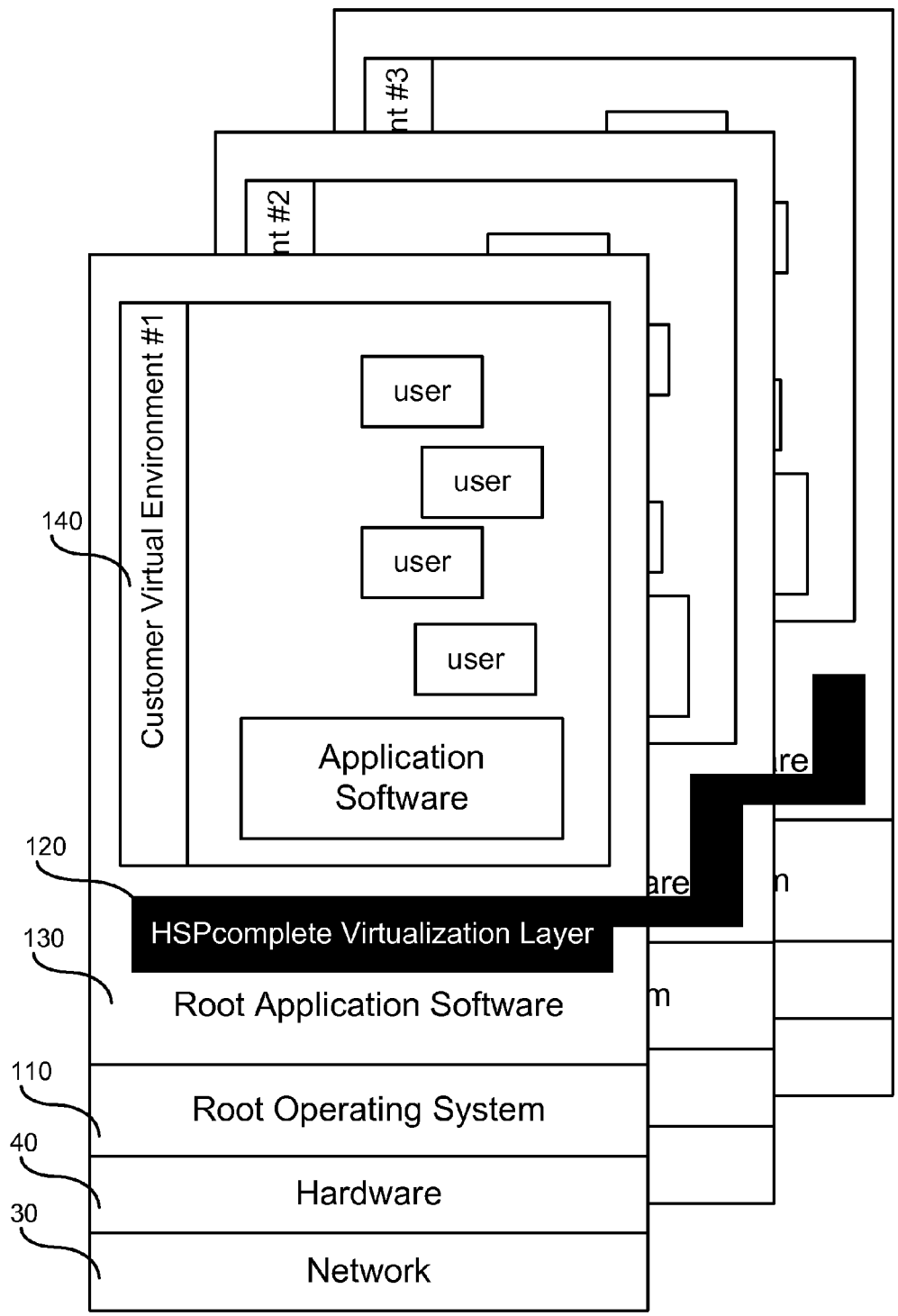
FIG. 2 is a schematic of the virtualization of an operating system technique.

A virtual environment is a fully functional virtual machine that may be easily run by users and operated by an operating system. In contrast to IBM, VMware, and other similar software, virtual environment emulates no hardware. Every virtual environment represents a personal protected machine with a root operating system 110 and root application software 120 that works as a separate workstation or a server as shown in FIG. 2. Several virtual environments may function at one and the same computer at the same time. The OS virtualization layer 130, called HSP complete virtualization layer, allows users to access a virtual environment 140 which represents their personal server with super-user rights that allow software installation, addition of users, etc. Virtual environments of one and the same computer are completely isolated from each other. A user of one virtual environment is unaware of other active virtual environments and their inner processes.

Inside a virtual environment, users are able to install any software supported by the underlying operating system, such as their own web-servers with CGI-scripts and dynamic modules, email servers, ftp servers, RealAudio/Video servers, X-servers with remote access and sshd servers. They also may build their own firewall, use programs compiled from the source code, and install practically any application. In other words, users are able to do whatever they prefer at a separate computer connected to the Internet. Thus the system of virtual environments substantially overlaps the regular set of webhosting services.

From the point of view of users and system administrators, all the virtual environments constitute a set of highly unified remote computers with simple and well formalized maintenance where installation is reduced to a minimum. High commonality results in highly efficient control tools, which enables the management of a great number of similar virtual environments. From the users' perspective, virtual environments decrease training time and reduce routine operation requirements.

Several computers with a set of installed virtual environments constitute a standardized environment able to provide hosting services to end-users in terms of virtual environments.

Figure 3:
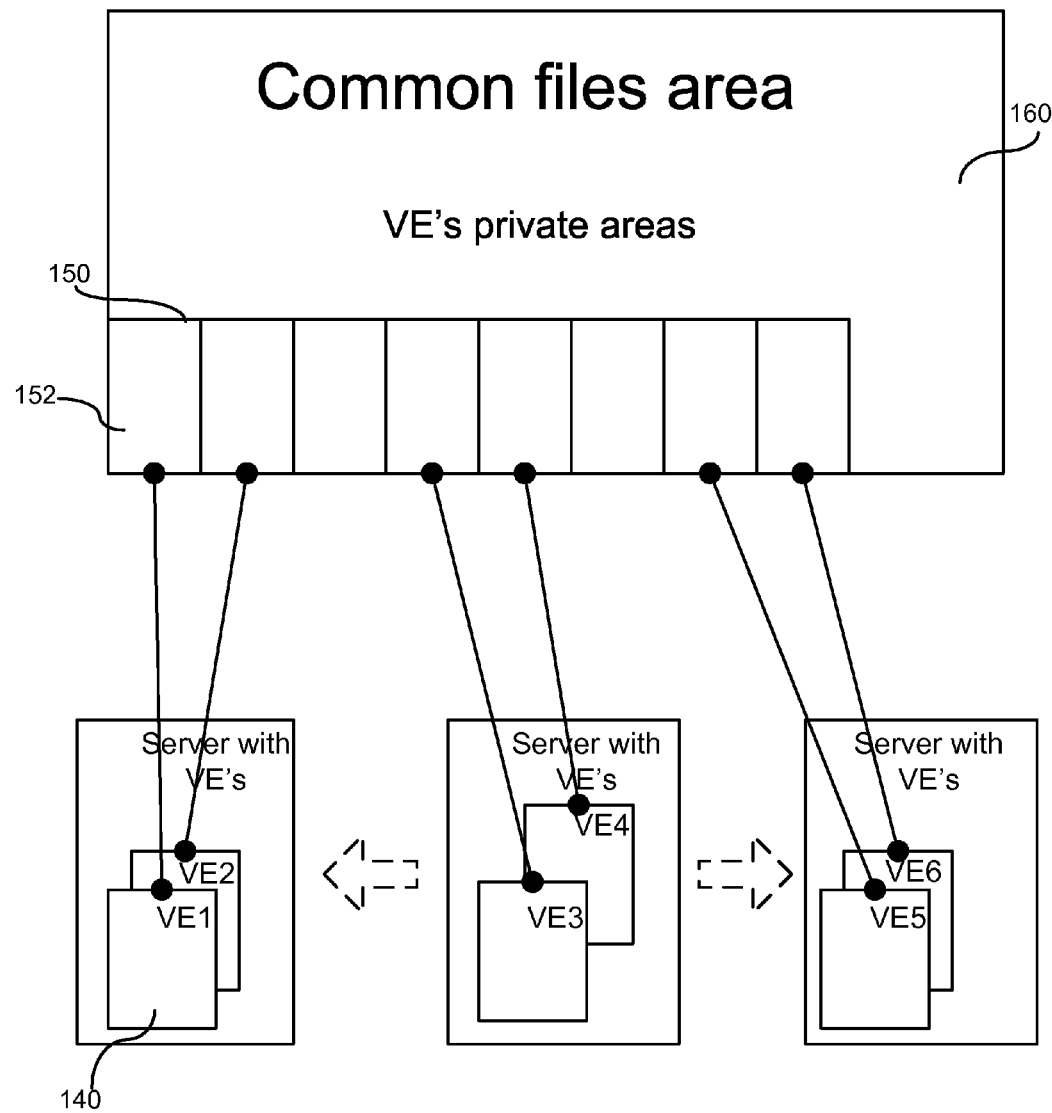
FIG. 3 is a schematic of the usage of a distributed file system for data storage of virtual environments.

In the present invention, a distributed file system is used and all the computers are connected in such a way as to make private data 152 from each virtual environment 140 in the common files area 160 visible at every participating computer, as shown in FIG. 3. Private data 152 for a particular file is stored in the common files area 160 in the virtual environment's private data areas 150. This private data 152 is visible from every cluster node and is utilized to restart a virtual environment if necessary. This scheme raises the fault-tolerance level in case of software or hardware failure as all the virtual environments may be easily restarted at any computer of the cluster. The distributed file system makes the data from the failed computer available to users. Additionally, the distributed file system allows successful hardware maintenance as every virtual environment may be easily moved from one computer to another, i.e., virtual environments from a computer under scheduled maintenance can be moved to another machine almost invisibly to users.

Figure 4:
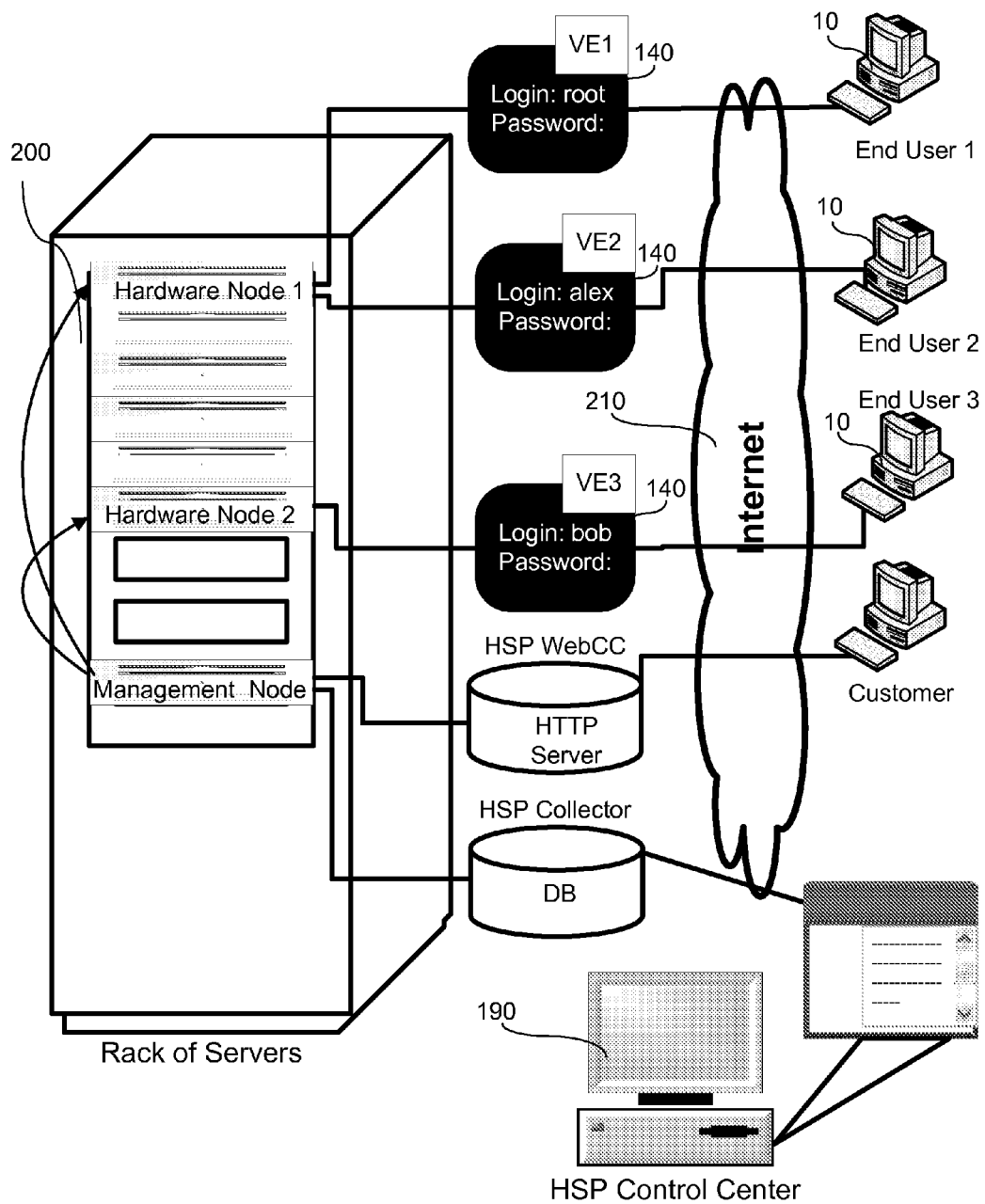
FIG. 4 is a schematic of the general configuration of a cluster and its interaction with end users.

In the present invention, a set of virtual environments 140 is launched and several computers are combined with a distributed file system 180 and a control center 190 into a sharable cluster (see FIG. 4). A cluster consists of a control center 190 and a set of hardware nodes 200 where virtual environments 140 have been launched. End users 10 are linked to their virtual environments 140 via the Internet 210. Administration is carried out through the control center 190 by means of the Internet 210 or local network. Such a cluster may provide efficient HSP with cost-effective support and a high level of scalability.

Initial installation comes as another challenge for the administration of any multi-computer system. As a rule, initial installation of any computer requires manual intervention by the administrator. This makes the installation of multiple computers a difficult and resource-consuming operation. A computer used as a platform to launch virtual environments is installed automatically in full from a corresponding server or a CDROM. After the fully automatic installation has been completed to the local disk of a newly introduced computer, the computer platform is available for effective control from data center control tools, is connected to the distributed file system, and becomes registered as ready for servicing (i.e., ready for launching new virtual environments). If a server is to be turned off for scheduled maintenance, the server first informs the control center, and the control center moves the launched virtual environments to an alternative server. It is only after this is accomplished that the server is disconnected and the center is notified of the disconnection. Thus, cluster functioning, for the most part, is accomplished without an administrator taking part in the process.

Figure 5:
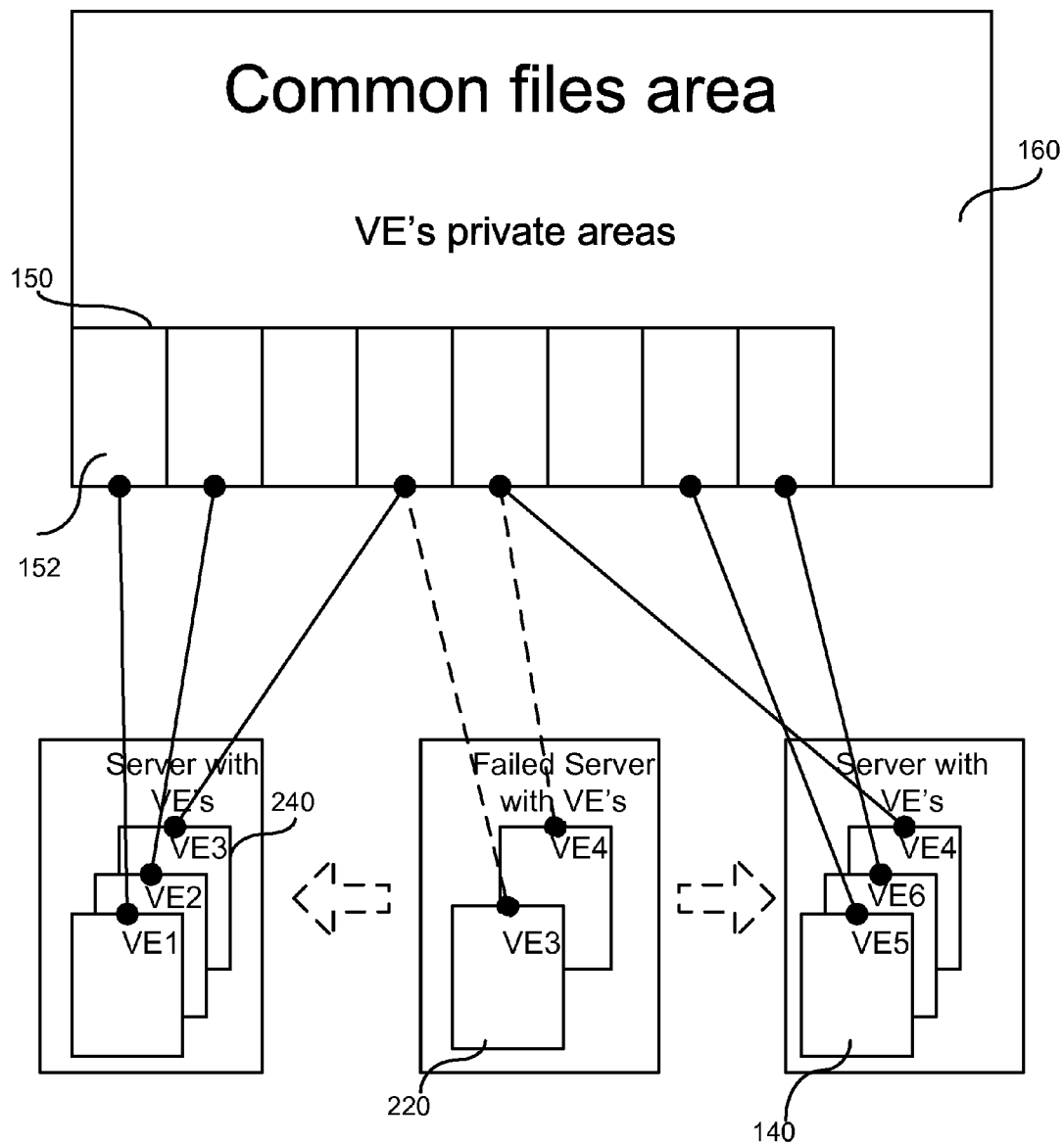
FIG. 5 is a schematic illustrating the installation of virtual environments by means of the distributed file system in case of a cluster node failure.

In the past, the absence of remote repairing instruments made an administrator's personal interference indispensable when an operating system software configuration at a dedicated or displaced computer was damaged. Such is not the case for a cluster configuration associated with virtual environments. Even a failed software configuration of a particular virtual environment does not require a user's physical presence Files of a failed virtual environment 220 are accessed from a newly created virtual environment 240, allowing a user 10 to repair a failed software configuration as shown in FIG. 5. This is possible because failures of this type do not influence the other virtual environments 140 nor underlying operating system 50. Because the private data 152 of the virtual environments 140 is accessible from every hardware node 200, switching off any cluster node from virtual environment servicing may be backed up by neighboring cluster nodes.

The disclosed system and method has been disclosed by reference to its preferred embodiment. Those of ordinary skill in the art will understand that additional embodiments of the disclosed system and method are made possible by the foregoing disclosure. Such additional embodiments shall fall within the scope and meaning of the appended claims.

What is claimed is:

1. A computer cluster for providing hosting services, comprising:

a plurality of nodes, the nodes being responsive to administrative requests; and each node including a virtual environment such that each virtual environment responds to user requests and appears to the user as having its own operating system, wherein any virtual environments running on the node share the same host operating system with other virtual environments of that node;

an operating system virtualization layer that allows users to access their virtual environments with super-user rights;

a distributed file system that permits private data from each virtual environment to be located in the common area and visible to every node and usable for restarting a virtual environment.

2. The cluster of claim 1, further comprising a distributed file system having a common name space, wherein different virtual environments of the same node have at least some files with the same names, and wherein the distributed file system stores data for the plurality of virtual environments.

3. The cluster of claim 2, wherein the distributed file system further comprises:

means for making files containing transactions of any file system changes in at least one of the virtual environments;

means for distributing the files containing the transactions; and means for providing access to data from each node.

4. The cluster of claim 1, further comprising a distributed file system having a common name space, wherein the distributed file system is used for storing data for backing up and recovery of the virtual environments.

5. The cluster of claim 1, further comprising a control center that sends administrative requests to the nodes.

6. The cluster of claim 5, wherein the control center is located on a remote computer.

7. The cluster of claim 1, wherein the virtual environment further comprises:
 a unique administrative root user;
 a file system template and file tree; and
 operating system parameter configuration.

8. A system for providing hosting services comprising;
 a plurality of nodes organized into a cluster;
 at least one virtual environment on each node that provides hosting services to users, wherein each virtual environment virtualizes a full service operating system and responds to user requests,
 wherein the virtual environments share the operating system of their corresponding node; and
 a control center that coordinates functions of the cluster.
 on each node, an operating system virtualization layer that allows users to access their virtual environments with super-user rights;
 a distributed file system that permits private data from each virtual environment to be located in the common area and visible to every node and usable for restarting a virtual environment on any node.

9. A method for providing hosting services comprising:
 forming a computer cluster from a plurality of nodes;
 establishing a control center for coordinating functions of the nodes; and
 operating at least one virtual environment on each node, such that each virtual environment responds to user requests and appears to the user as having its own operating system,
 wherein the virtual environment shares the host operating system of their corresponding node;
 starting an operating system virtualization layer that allows users to access their virtual environments with super-user rights;
 starting a distributed file system that permits private data from each virtual environment to be located in the common area and visible to every node and usable for restarting a virtual environment.

10. The method of claim 9, further comprising activating a distributed file system having a common name space, wherein different virtual environments of the same node have at least some files with the same names.

11. The method of claim 10, further comprising:
 establishing a unique administrative root user for each virtual environment;
 establishing a file system template and a file tree for each virtual environment; and
 configuring operating system parameters for each virtual environment corresponding to its unique administrative root user.

12. The method of claim 9, wherein the step of operating the virtual environment further comprises:
 making files containing transactions of any changes in the file system in the virtual environment;
 providing access to files containing transactions from each node.

13. The method of claim 12, further comprising:
 establishing and configuring network connections for each node;
 providing access to the distributed file system containing the file system template for each virtual environment of that node;
 accessing hardware resources of the node; and
 launching new virtual environments on the node.

14. The method of claim 9, further comprising utilizing a distributed file system having a common name space.

15. The method of claim 14, further comprising:
 making files containing transactions of any file system changes in at least one of the virtual environments; and
 distributing the files containing the transactions.

16. The method of claim 9, further comprising utilizing a distributed file system having a common name space, wherein the distributed file system is used for storing data for backing up and recovery of the virtual environments.

17. The method of claim 9, further comprising utilizing a control center that sends administrative requests to the nodes.

18. The method of claim 9, wherein the virtual environment further comprises a unique administrative root user.

19. The method of claim 9, wherein the virtual environment further comprises a file system template and file tree.

20. The method of claim 9, further comprising operating system parameter configuration.

* * * * *